United States Patent
Cohen et al.

(10) Patent No.: US 9,672,279 B1
(45) Date of Patent: *Jun. 6, 2017

(54) CLUSTER LABELING SYSTEM FOR DOCUMENTS COMPRISING UNSTRUCTURED TEXT DATA

(71) Applicant: EMC Corporation, Hopkinton, MA (US)

(72) Inventors: Raphael Cohen, Beer-Sheva (IL); Alon Grubshtein, Lehavim (IL); Aisling J. Crowley, Ballincollig (IE); Peter R. Elliot, Kinsale (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 217 days.

This patent is subject to a terminal disclaimer.

(21) Appl. No.: 14/501,431

(22) Filed: Sep. 30, 2014

(51) Int. Cl.
*G06F 7/00* (2006.01)
*G06F 17/00* (2006.01)
*G06F 17/30* (2006.01)
*G06N 7/00* (2006.01)

(52) U.S. Cl.
CPC .. *G06F 17/30713* (2013.01); *G06F 17/30011* (2013.01); *G06N 7/00* (2013.01)

(58) Field of Classification Search
CPC ......... G06F 17/30867; G06F 17/30598; G06F 17/30705; G06F 17/30784; G06F 17/3089; G06F 17/30; G06F 17/30696
See application file for complete search history.

(56) References Cited

U.S. PATENT DOCUMENTS

| 7,765,212 B2 | 7/2010 | Surendran et al. |
| 7,912,847 B2 | 3/2011 | Lagad et al. |
| 8,396,741 B2 | 3/2013 | Kannan et al. |
| 8,458,115 B2 | 6/2013 | Cai et al. |

(Continued)

OTHER PUBLICATIONS

J. Chuang et al., "Termite: Visualization Techniques for Assessing Textual Topic Models," Proceedings of the ACM International Working Conference on Advanced Visual Interfaces (AVI), May 2012, pp. 74-77, Capri Island, Naples, Italy.

(Continued)

*Primary Examiner* — Susan Chen
(74) *Attorney, Agent, or Firm* — Ryan, Mason & Lewis, LLP

(57) ABSTRACT

An apparatus comprises a processing platform configured to implement a cluster labeling system for documents comprising unstructured text data. The cluster labeling system comprises a clustering module and a visualization module. The clustering module implements a topic model generator and is configured to assign each of the documents to one or more of a plurality of clusters based at least in part on one or more topics identified from the unstructured text data using at least one topic model provided by the topic model generator. The visualization module comprises multiple view generators configured to generate respective distinct visualizations of a selected one of the clusters. The multiple view generators include at least a bigram view generator configured to provide a visualization of a plurality of term pairs from the selected cluster, and a summarization view generator configured to provide a visualization of representative term sequences from the selected cluster.

20 Claims, 10 Drawing Sheets

(56) References Cited

U.S. PATENT DOCUMENTS

| | | | |
|---|---|---|---|
| 8,645,395 | B2 | 2/2014 | Mushtaq et al. |
| 8,719,302 | B2 | 5/2014 | Bailey et al. |
| 8,738,361 | B2 | 5/2014 | Gryc et al. |
| 9,317,498 | B2 * | 4/2016 | Baker ................. G06F 17/2705 |
| 9,378,200 | B1 * | 6/2016 | Cohen ..................... G06N 5/04 |
| 2004/0117725 | A1 * | 6/2004 | Chen ................ G06F 17/30719 715/254 |
| 2004/0117740 | A1 * | 6/2004 | Chen ........................... 715/210 |
| 2009/0043797 | A1 | 2/2009 | Dorie et al. |
| 2010/0011192 | A1 * | 1/2010 | Boyer ................ G06K 9/00986 712/220 |
| 2011/0136542 | A1 | 6/2011 | Sathish |
| 2013/0097167 | A1 | 4/2013 | St. Jacques, Jr. et al. |
| 2013/0211880 | A1 | 8/2013 | Kannan et al. |
| 2013/0325440 | A1 * | 12/2013 | Kim ........................ G06F 17/27 704/9 |
| 2014/0019118 | A1 * | 1/2014 | Tromp .................. G06F 17/274 704/9 |
| 2014/0101086 | A1 | 4/2014 | Lu et al. |
| 2015/0356571 | A1 * | 12/2015 | Chang ................ G06Q 30/0201 705/7.29 |

OTHER PUBLICATIONS

R. Cohen et al., "Redundancy in Electronic Health Record Corpora: Analysis, Impact on Text Mining Performance and Mitigation Strategies," BMC Bioinformatics, Apr. 2013, pp. 1-15, vol. 14, No. 10.

R. Cohen, "Towards Understanding of Medical Hebrew," Thesis, Ben-Gurion University of the Negev, Nov. 2012, 127 pages.

D.M. Blei et al., "Latent Dirichlet Allocation," Journal of Machine Learning Research, Jan. 2003, pp. 993-1022, vol. 3.

A.K. McCallum, "Mallet: A Machine Learning for Language Toolkit," 2002, 2 pages.

H.M. Wallach et al., "Rethinking LDA: Why Priors Matter," Advances in Neural Information Processing Systems 22: 23rd Annual Conference on Neural Information Processing Systems, Dec. 2009, 9 pages, Vancouver, British Columbia, Canada.

P.F. Brown et al., "Class-Based n-gram Models of Natural Language," Association for Computation Linguistics, 1992, pp. 467-479, vol. 18, No. 4.

S. Banerjee et al., "The Design, Implementation and Use of the Ngram Statistics Package," Proceedings of the 4th International Conference on Computational Linguistics and Intelligent Text Processing (CICLing), 2003, pp. 370-381.

A. Nenkova et al., "The Impact of Frequency on Summarization," Microsoft Research, Tech. Rep. MSR TR-2005-101, Jan. 2005, 8 pages.

H. Daumé III et al., "Bayesian Query-Focused Summarization," Proceedings of the 21st International Conference on Computational Linguistics and 44th Annual Meeting of the ACL, Jul. 2006, pp. 305-312, Sydney, Australia.

J.M. Conroy et al., "CLASSY Query-Based Multi-Document Summarization," Proceedings of the 2005 Document Understanding Workshop, Oct. 2005, 9 pages.

T. Baumel et al., "Query-Chain Focused Summarization," Proceedings of the 52nd Annual Meeting of the Association for Computational Linguistics, Jun. 2014, pp. 913-922, vol. 1.

G. Erkan et al., "LexRank: Graph-Based Lexical Centrality as Salience in Text Summarization," Journal of Artificial Intelligence Research, Dec. 2004, pp. 457-479, vol. 22.

U.S. Patent Application filed concurrently herewith and entitled "Automated Content Inference System for Unstructured Text Data."

* cited by examiner

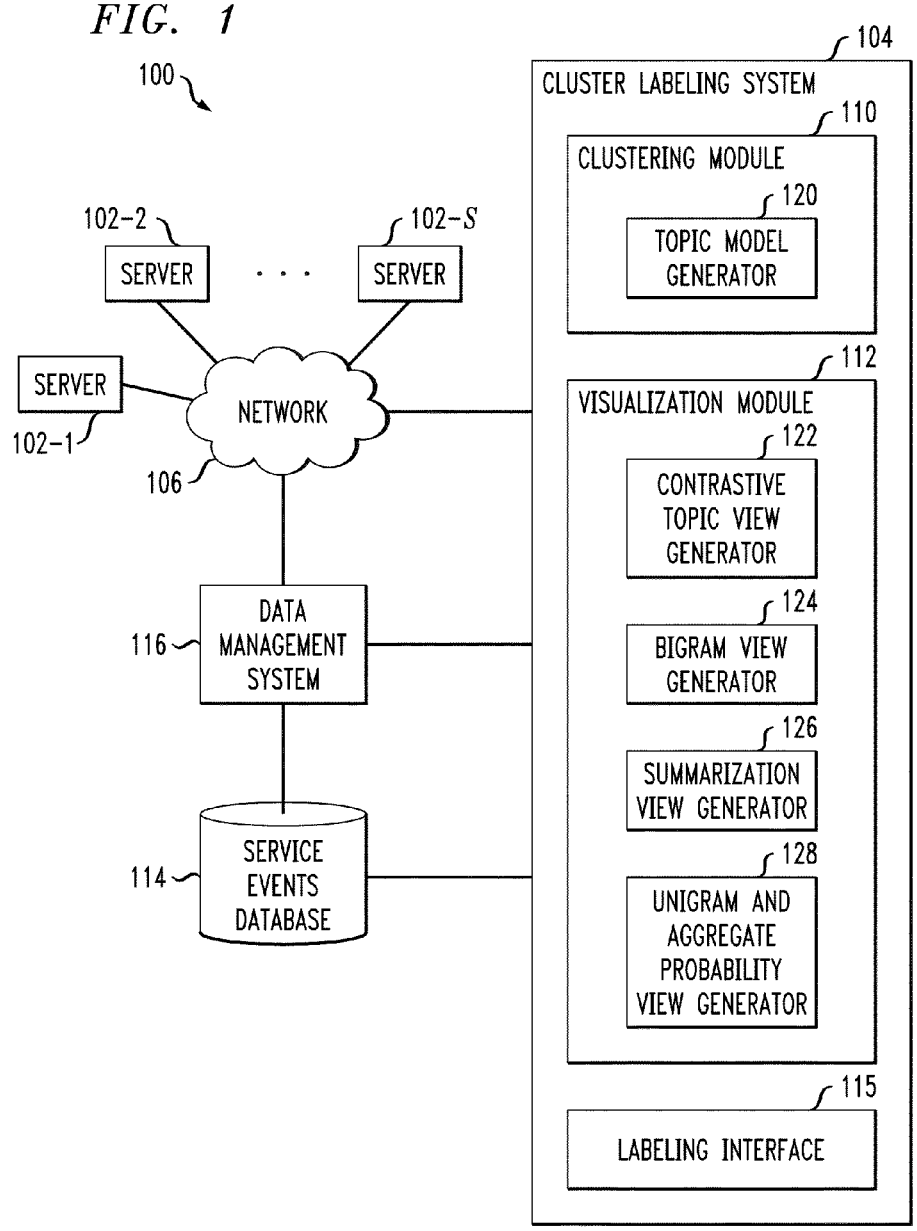

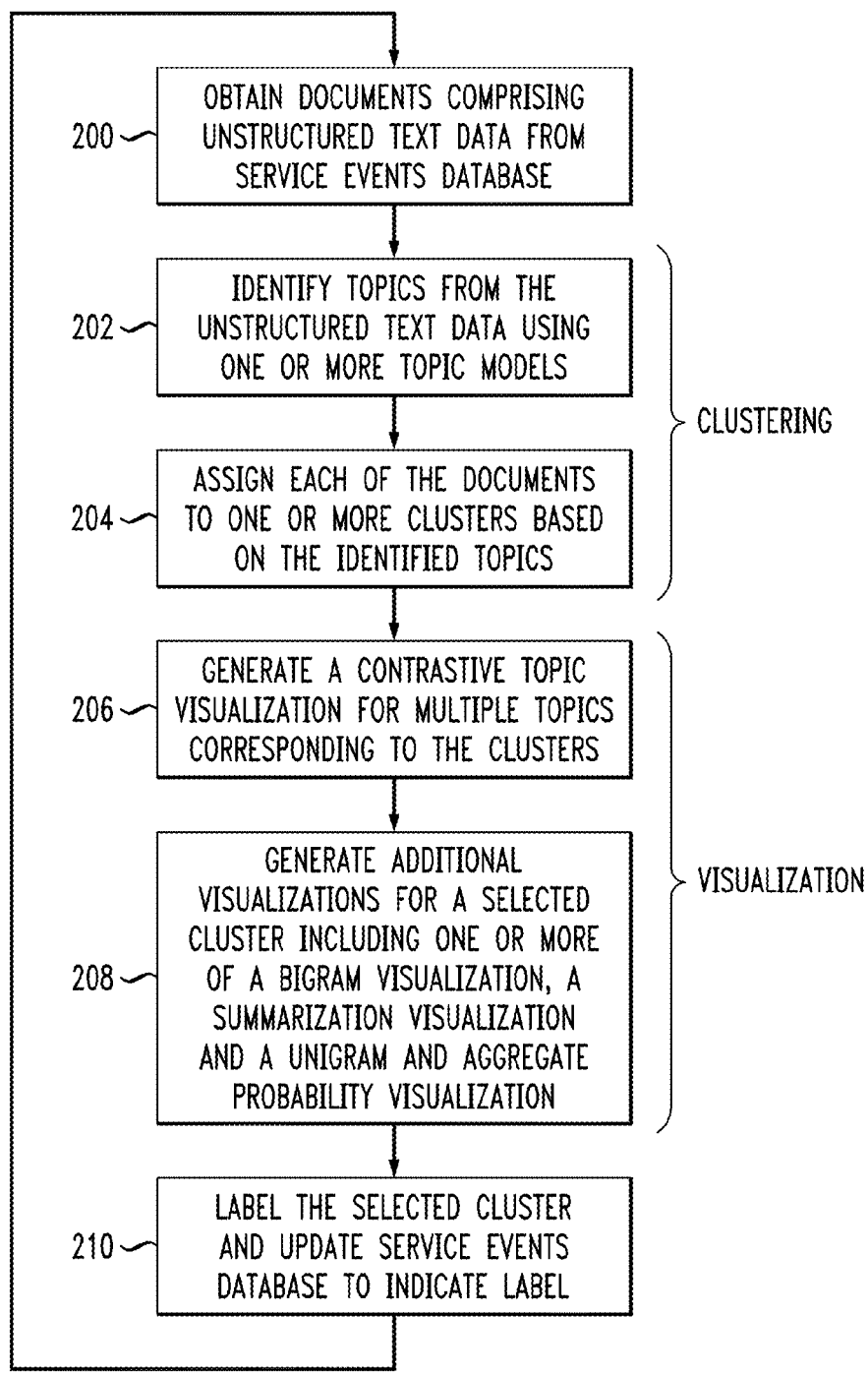

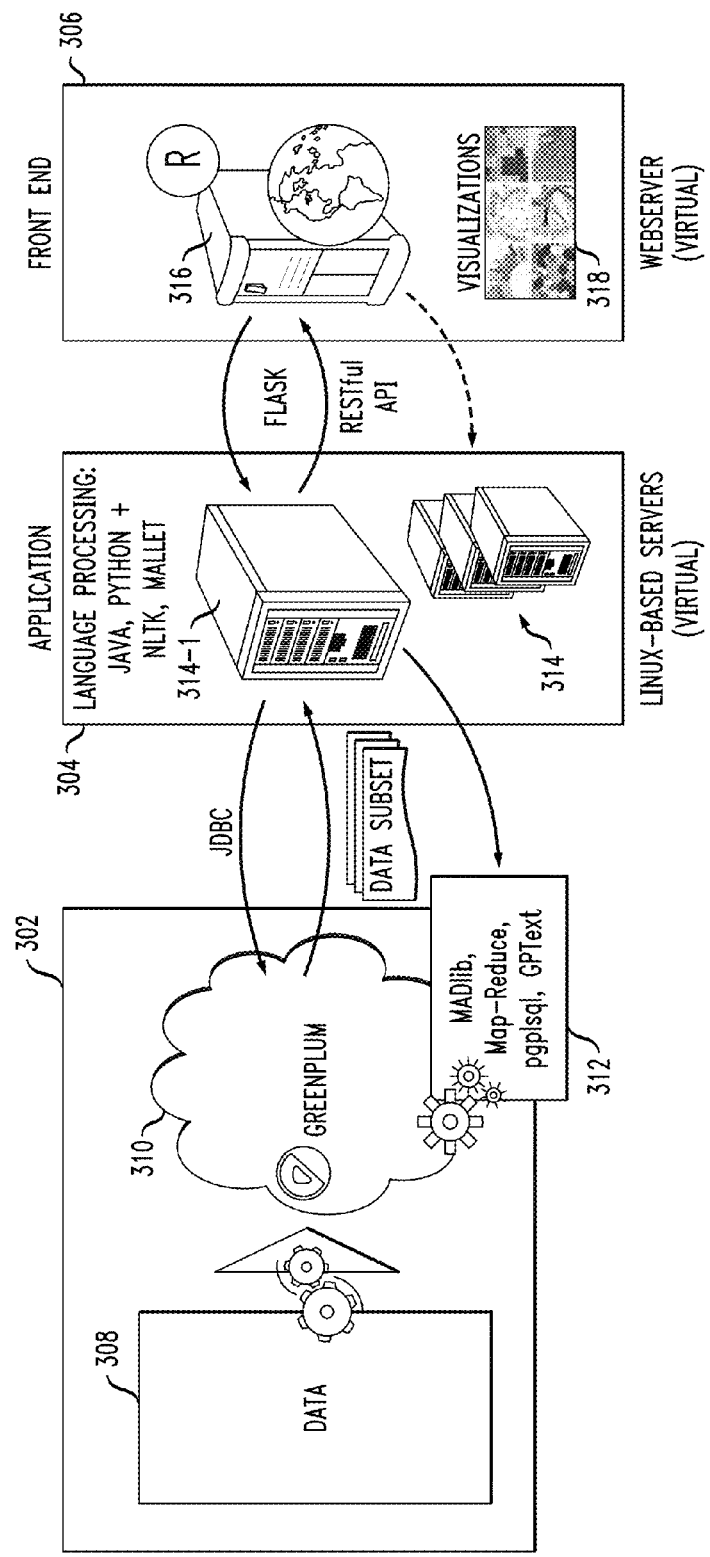

UNIGRAM AND AGGREGATE PROBABILITY VISUALIZATION
1. SHOWS THE TOP WORDS ASSOCIATED WITH EACH OF MULTIPLE CLUSTERS.
2. PROVIDES THE AGGREGATE PROBABILITY OF THE TOP WORDS APPEARING IN A GIVEN CLUSTER (i.e., A MEASURE OF "COMPACTNESS").

IN THIS EXAMPLE, WORDS INCLUDE: "upgrade", "install", "apply", "hotfix", "sp2" and "hf". THESE WORDS RELATE TO RESOLUTION VIA AN UPGRADE OR HOT FIX.

| study_id | topic_id | importance | topwords |
|---|---|---|---|
| 502-0 | 0 | 0.20153 | issue resolve fix network report customer due work error system xdoctor proble working resolution relate m time follow sr |
| 502-1 | 1 | 0.20111 | sr open customer issue clo chasing work reopen update duplicate request sms complete site wrong require receive response ticket |
| 502-2 | 2 | 0.16877 | mds service node check running health online restart ran system status verify reboot sync remote tool xdoctor perform fine |
| 502-3 | 3 | 0.15100 | upgrade fix issue install hf code apply hotfix atmos engineering successfully complete schedule installation |

Showing 1 to 12 of 12 entries

CLUSTER LABELING SYSTEM FOR DOCUMENTS COMPRISING UNSTRUCTURED TEXT DATA

FIELD

The field relates generally to information processing systems, and more particularly to document clustering.

BACKGROUND

In many information processing systems, service event analysis relies heavily on inefficient manual activities. For example, it is common in some systems for service personnel to be required to complete forms describing problems experienced by customers and the manner in which these problems were resolved. These forms often utilize static sets of predetermined problem and resolution codes that, in the interest of convenience to the service personnel, tend to be overly general and vague.

Supplementary unstructured text data added to such forms is often ignored as it requires special treatment. For example, the unstructured text data may require manual screening in which a corpus of unstructured text data is reviewed and sampled by service personnel. Alternatively, the unstructured text data may require manual customization and maintenance of a large set of rules that can be used to determine correspondence with predefined themes of interest. Such processing is unduly tedious and time-consuming, particularly for large volumes of unstructured text data.

SUMMARY

Illustrative embodiments of the present invention provide cluster labeling systems that can be used to label clusters of documents comprising unstructured text data from a service events database in a particularly efficient manner.

In one embodiment, an apparatus comprises a processing platform configured to implement a cluster labeling system for documents comprising unstructured text data from a service events database. The cluster labeling system comprises a clustering module and a visualization module. The clustering module implements a topic model generator and is configured to assign each of the documents to one or more of a plurality of clusters based at least in part on one or more topics identified from the unstructured text data using at least one topic model provided by the topic model generator. The visualization module comprises multiple view generators, with the multiple view generators being configured to generate respective distinct visualizations of a selected one of the clusters.

The visualization module may be further configured to generate a contrastive topic visualization for multiple topics corresponding to multiple ones of the clusters.

The multiple view generators illustratively include at least a bigram view generator configured to provide a visualization of a plurality of term pairs from the selected cluster, and a summarization view generator configured to provide a visualization of representative term sequences from the selected cluster. Additionally or alternatively, the multiple view generators can include a unigram and aggregate probability view generator configured to provide a visualization of a plurality of individual terms from the selected cluster with the aggregate probability comprising a combination of individual probabilities that respective ones of the terms appear in the selected cluster.

The cluster labeling system can further include a labeling interface permitting user entry of a label for the selected cluster. In such an arrangement, the cluster labeling system is illustratively configured to update the service events database to indicate a user-entered label for the selected cluster.

The unstructured text data in some embodiments illustratively comprises unstructured service request summaries. For example, the unstructured service request summaries may comprise problem summaries and corresponding solution summaries relating to respective service events.

The illustrative embodiments provide a number of significant advantages relative to the conventional arrangements described previously. For example, these embodiments avoid the need for manual screening in which a corpus of unstructured text data is reviewed and sampled by service personnel.

Moreover, the cluster labeling systems in the illustrative embodiments are data driven in that relevant topics are elevated automatically from the actual unstructured text data itself rather than determined by attempting to impose a limited set of predefined themes on the unstructured text data. As a result, there is no need for manual customization and maintenance of a large set of rules that can be used to determine correspondence with predefined themes of interest. For example, the illustrative embodiments do not require rule updates to accommodate previously unseen terms appearing in unstructured text data.

In addition, cluster labeling systems as disclosed herein can provide significant insights into unstructured text data in a very short period of time. Particular studies can be configured and executed quickly, with large quantities of analysis output being available almost immediately. Also, such studies can be easily reconfigured and repeated as needed using different sets of parameters.

Embodiments of the invention include, without limitation, apparatus, systems, methods, and articles of manufacture comprising processor-readable storage media.

BRIEF DESCRIPTION OF THE DRAWINGS

FIG. 1 is a block diagram of an information processing system that includes a cluster labeling system in an illustrative embodiment of the invention.

FIG. 2 is a flow diagram of an exemplary process implemented in the information processing system of FIG. 1.

FIG. 3 shows another illustrative embodiment of an information processing system configured to include a cluster labeling system.

FIG. 5 shows an additional user interface display generated by a cluster labeling system in an illustrative embodiment.

DETAILED DESCRIPTION

Figure 4A:
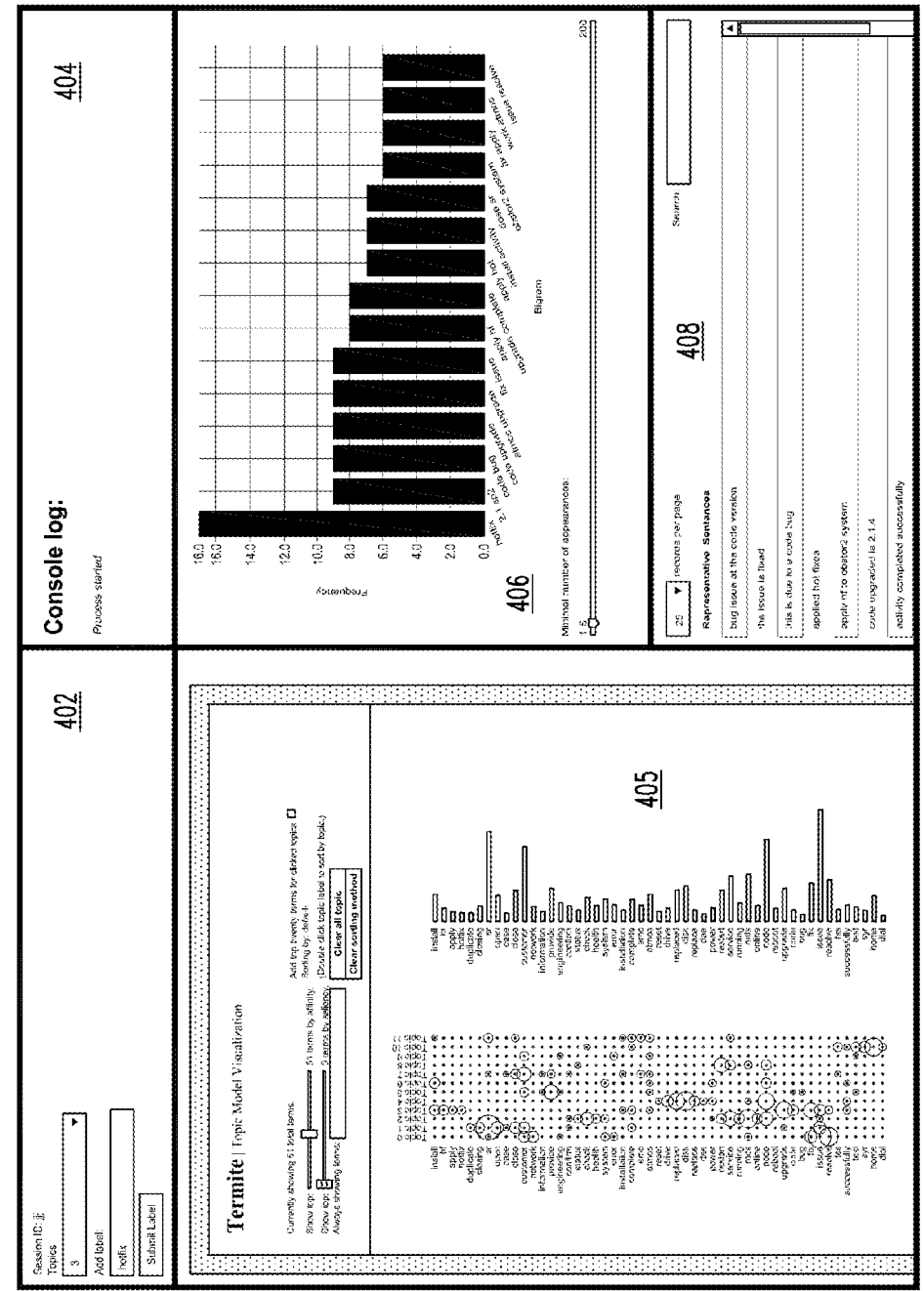
FIGS. 4A through 4E show different aspects of a user interface display generated by a cluster labeling system in an illustrative embodiment.

Illustrative embodiments of the present invention will be described herein with reference to exemplary information processing systems and associated processing platforms each comprising one or more processing devices. It is to be appreciated, however, that the invention is not restricted to use with the particular illustrative system, platform and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

FIG. 1 shows an information processing system 100 configured in accordance with an illustrative embodiment of the present invention. The information processing system 100 is assumed to be built on at least one processing platform and provides cluster labeling functionality. The cluster labeling functionality can be provided in conjunction with other types of related functionality, such as content inference functionality of a content inference system that incorporates or is otherwise associated with a cluster labeling system. A given cluster labeling system as disclosed herein may therefore be implemented as a portion of another system, such as a content inference system.

The information processing system 100 in this embodiment illustratively comprises a plurality of servers 102-1, 102-2, . . . 102-S and a cluster labeling system 104, all of which are coupled to and communicate over a network 106. The cluster labeling system 104 is separated into a plurality of functional modules, including a clustering module 110 and a visualization module 112.

The cluster labeling system 104 is coupled to a service events database 114. The service events database 114 stores unstructured text data in the form of multiple documents each relating to one or more service events arising within the system 100 or within associated systems not explicitly shown. The service events database 114 illustratively comprises one or more storage disks, storage arrays, electronic memories or other types of memory, in any combination. Although shown as separate from the cluster labeling system 104 in FIG. 1, the service events database 114 in other embodiments can be at least partially incorporated within the cluster labeling system 104, or within one or more other system components.

The documents stored in the service events database 114 need not be in any particular format or formats, but generally comprise unstructured text data, possibly in combination with other types of data such as structured text data. Moreover, a given set of documents subject to processing in embodiments of the invention can illustratively include documents of a variety of different formats. The term "document" as used herein is therefore intended to be broadly construed.

The cluster labeling system 104 further includes a labeling interface 115 permitting user entry of a label for a selected cluster. In addition, the cluster labeling system 104 is illustratively configured to update the service events database 114 to indicate a given user-entered label for the selected cluster.

In the present embodiment, the cluster labeling system 104 and the service events database 114 are associated with a data management system 116. The cluster labeling system 104 can communicate directly with the service events database 114 and the data management system 116, and additionally or alternatively can communicate with these system components via the network 106.

The cluster labeling system 104 more particularly comprises a topic model generator 120 implemented in the clustering module 110, and a plurality of view generators implemented in the visualization module 112.

The clustering module 110 is configured to assign each of a plurality of documents to one or more of a plurality of clusters based at least in part on one or more topics identified from the unstructured text data of those documents using at least one topic model provided by the topic model generator 120.

The view generators illustratively include a contrastive topic view generator 122, a bigram view generator 124, a summarization view generator 126, and a unigram and aggregate probability view generator 128. The contrastive topic view generator 122 generates a contrastive topic visualization for multiple topics corresponding to multiple ones of the clusters. An example of a contrastive topic visualization will be described in more detail below with reference to FIG. 4C. The other view generators 124, 126 and 128 of the visualization module 112 are configured to generate respective distinct visualizations of at least a selected one of the clusters, and examples of these visualizations will be described in more detail below in conjunction with FIGS. 4D, 4E and 5, respectively.

The bigram view generator 124 is more particularly configured to provide a visualization of a plurality of term pairs from the selected cluster.

The summarization view generator 126 is more particularly configured to provide a visualization of representative term sequences from the selected cluster.

The unigram and aggregate probability view generator 128 is more particularly configured to provide a visualization of a plurality of individual terms from the selected cluster with the aggregate probability comprising a combination of individual probabilities that respective ones of the terms appear in the selected cluster.

In the examples to be described in conjunction below in conjunction with FIGS. 4A through 4E and FIG. 5, the individual terms comprise respective words, the term pairs comprise respective word pairs, and the term sequences comprise respective sentences each having three or more words. However, other types of terms, term pairs and term sequences can be used in other embodiments. Also, phraseology such as "word" and "sentence" as used herein is intended to be broadly construed, and should not be viewed as requiring strict conformance to particular languages, grammatical constructs, etc.

It should be noted that different subsets of the view generators 122, 124, 126 and 128 can be used in other embodiments. For example, in one possible alternative embodiment, the visualization module 112 illustratively comprises only bigram view generator 124 and summarization view generator 126.

In other embodiments, the cluster labeling system 104 can include one or more additional modules, such as a preprocessing module for applying preprocessing operations such as data indexing and dictionary generation to unstructured text data. Alternatively, such a preprocessing module can be implemented in a related content inference system that incorporates or is otherwise associated with the cluster labeling system.

By way of example, a preprocessing module of the type described above illustratively comprises a data indexer and a dictionary generator.

The data indexer is configured to process unstructured text data of one or more documents obtained from the service events database 114 in order to construct a term index for at least a given one of the documents. The unstructured text data illustratively comprises unstructured service request summaries, such as problem summaries and corresponding solution summaries, relating to service events. In some embodiments, the unstructured text data has structured data associated therewith in the service events database 114 and the term index is based on both the unstructured text data and the associated structured data. Examples of structured data include indications of region, team, etc.

The dictionary generator is configured to process one or more term indexes generated by the data indexer in order to construct one or more in-domain dictionaries. In this context, the term "in-domain" refers to a domain comprising specified unstructured text data of one or more documents, although other types of domains can be used in other embodiments. The dictionary generator is illustratively configured to implement automatic lemmatization and synonym extraction, but in other embodiments different types of dictionary generators may be used.

Additional details regarding exemplary dictionary generation techniques that may be utilized in embodiments of the present invention can be found in R. Cohen, "Towards Understanding of Medical Hebrew," Dissertation, Ben-Gurion University of the Negev, 2012; P. F. Brown et al., "Class-based n-gram models of natural language," Computational Linguistics 18.4 (1992): 467-479; and S. Banerjee et al., "The design, implementation, and use of the ngram statistics package," Computational Linguistics and Intelligent Text Processing 2003:370-381, which are incorporated by reference herein.

The topic model generator 120 of the clustering module 110 is configured to process one or more in-domain dictionaries in order to construct at least one topic model. In the present embodiment, it is assumed that the topic model generator 120 in generating the topic model utilizes latent Dirichlet allocation (LDA) with asymmetric priors, although other techniques can be used, including, for example, probabilistic latent semantic analysis (pLSA), canonical-correlation analysis (CCA), or combinations of these and other topic modeling algorithms. The topic model generator 120 illustratively provides lists of topics at least a subset of which are elevated as respective sets of related terms from the unstructured text data.

Examples of topic modeling algorithms suitable for use in embodiments of the present invention are disclosed in, for example, R. Cohen et al., "Redundancy in electronic health record corpora: analysis, impact on text mining performance and mitigation strategies," BMC Bioinformatics 2013, 14:10; D. M. Blei et al., "Latent dirichlet allocation," The Journal of Machine Learning Research 2003, 3:993-1022; A. K. McCallum, "Mallet: A machine learning for language toolkit," 2002; and H. Wallach et al., "Rethinking LDA: Why priors matter," Advances in Neural Information Processing Systems 2009, 22:1973-1981, which are incorporated by reference herein.

The visualization module 112 is configured to provide an output display showing at least a subset of the various visualizations generated by the view generators 122, 124, 126 and 128. The output display illustratively comprises one of a plurality of user interface displays that are generated under the control of the visualization module 112 and presented on a display screen of a user device not explicitly shown in FIG. 1. For example, such a user device may comprise a computer, mobile telephone or other type of processing device adapted for communication with the cluster labeling system 104 over the network 106.

The service events database 114 may be updated to indicate the assignment of one or more topics to the given document. Such a topic assignment is an example of what is more generally referred to herein as a "content inference."

As mentioned previously, the cluster labeling system 104 in some embodiments is incorporated in or otherwise associated with a content inference system.

The cluster labeling system 104 is advantageously data driven in that relevant topics are elevated automatically from the actual unstructured text data itself rather than determined by attempting to impose a limited set of predefined themes on the unstructured text data. This provides significant improvements in unstructured text data analysis and visualization relative to the conventional approaches previously described. For example, resulting topic distributions and associated visualizations can be used to identify sets of documents sharing semantic similarity.

The cluster labeling system 104 considerably facilitates text data exploration in large volumes of unstructured text data, and in particular the problem and resolution summaries that are common to service requests. It enables analysts to quickly obtain content inferences from multiple sets of unstructured text data, and to determine appropriate labels for clusters of corresponding documents.

The cluster labeling system 104 in the illustrative embodiments does not characterize individual system users but instead models unstructured text data of one or more documents from the service events database 114. By way of example, such an arrangement allows particularly efficient analysis and visualization of overall customer interactions with a corporate or enterprise support organization.

The cluster labeling system 104 in some embodiments is implemented as part of an analysis and visualization tool for unstructured text data analysis and visualization. Such a tool can be associated with the service events database 114, the data management system 116 or another system component. By way of example, the user interfaces of FIGS. 4A through 4E and FIG. 5 can be generated by a tool of this type.

It is to be appreciated that the particular arrangement of system components illustrated in FIG. 1 is exemplary only, and that numerous other arrangements of components may be used in other embodiments. For example, in other embodiments, functionality described herein as being associated with one or more of the topic model generator 120 and view generators 122, 124, 126 and 128 may be implemented at least in part using additional or alternative components of the system 100.

The cluster labeling system 104, and possibly other related components of system 100 such as the service events database 114, are assumed in the present embodiment to be implemented on a given processing platform using at least one processing device comprising a processor coupled to a memory.

The processor may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. These and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing electronic memory. The term "article of manufacture" as used herein should be understood to exclude transitory, propagating signals.

The one or more processing devices implementing the cluster labeling system 104, and possibly other components of system 100, may each further include a network interface that allows such components to communicate with one another over one or more networks. For example, a given such network interface illustratively comprises network interface circuitry that allows at least one of the topic model generator 120 and view generators 122, 124, 126 and 128 to communicate over a network with other components of the system 100 such as servers 102, service events database 114 and data management system 116. Such network interface circuitry may comprise, for example, one or more conventional transceivers.

The above-noted network may comprise, for example, a global computer network such as the Internet, a wide area network (WAN), a local area network (LAN), a satellite network, a telephone or cable network, a cellular network, a wireless network such as a WiFi network or a WiMAX network, or various portions or combinations of these and other types of networks.

At least a portion of the cluster labeling system 104, and possibly other system components, may comprise software that is stored in a memory and executed by a processor of at least one processing device.

Processing devices comprising processors, memories and network interfaces as described above are illustratively part of a processing platform comprising physical and virtual resources in any combination. Additional examples of such processing platforms that may be used to implement at least portions of the system 100 will be described in more detail below in conjunction with FIGS. 6 and 7.

Again, it should be understood that the particular sets of components implemented in the information processing system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be further described with reference to the flow diagram of FIG. 2, which illustrates an exemplary process carried out by the system 100 in one embodiment. The process as shown includes steps 200 through 210. Steps 200 through 210 are assumed to be performed by the cluster labeling system 104, but one or more of these steps may be performed at least in part by or in conjunction with other system components in other embodiments. Moreover, cluster labeling functionality as disclosed herein should not be viewed as being limited in any way to this particular illustrative arrangement of process steps.

In step 200, documents comprising unstructured text data are obtained by the cluster labeling system 104 from the service events database 114.

As mentioned previously, various preprocessing steps may be applied to the unstructured text data. For example, one or more term indexes may be constructed, possibly in the form of a document term matrix, or in another suitable format. Also, associated structured data may be taken into account in generating the one or more term indexes. One or more in-domain dictionaries may then be constructed based on the term index, possibly using automatic lemmatization and synonym extraction.

In step 202, topics are identified from the unstructured text data using one or more topic models. By way of example, a given such topic model can be constructed based on one or more of the above-noted in-domain dictionaries, possibly using LDA with asymmetric priors. Additionally or alternatively, one or more other topic modeling algorithms such as pLSA or CCA may be used.

In step 204, each of the documents is assigned to one or more clusters based on the identified topics. Accordingly, it is possible in this embodiment that a given document can be assigned to multiple clusters, such as two or three different clusters. The clusters in this embodiment are therefore examples of what are referred to herein as "soft" clusters. In other embodiments, the cluster labeling system 104 may be configured in some modes of operation such that each document can only be assigned to a single cluster, resulting in what are referred to herein as "hard" clusters.

Steps 202 and 204 in the present embodiment are considered examples of clustering steps performed by the clustering module 110. The one or more topic models referred to in step 202 are constructed by the topic model generator 120 of the clustering module 110.

In step 206, a contrastive topic visualization is generated for multiple topics corresponding to the clusters.

In step 208, multiple distinct visualizations of a selected one of the clusters are generated, including one or more of a bigram visualization, a summarization visualization and a unigram and aggregate probability visualization.

Steps 206 and 208 in the present embodiment are considered examples of visualization steps performed by the visualization module 112. The contrastive topic visualization, bigram visualization, summarization visualization and unigram and aggregate probability visualization are generated by the respective view generators 122, 124, 126 and 128 of the visualization module 112.

In generating the bigram visualization referred to in step 208, the bigram view generator 124 is illustratively configured to order the term pairs from the selected cluster based at least in part on pointwise mutual information (PMI) gain. As a more particular example, the bigram view generator 124 can initially order the term pairs based on PMI gain and then reorder the ordered term pairs based on frequency of occurrence in the selected cluster.

In generating the summarization visualization referred to in step 208, the summarization view generator 126 is illustratively configured to identify the representative term sequences from the selected cluster using an automatic summarization algorithm. Examples of automatic summarization algorithms that may be used in generating the summarization visualization include SumBasic, BayesSum and Classy.

Additional details regarding these and other exemplary summarization techniques suitable for use in embodiments of the invention are disclosed in, for example, A. Nenkova et al., "The Impact of Frequency on Summarization," MSR-TR-2005-101, 2005; H. Daume et al., "Bayesian Query-Focused Summarization," Proceedings of the 21st International Conference on Computational Linguistics, Sydney, Australia, July 2006, pp. 305-312; J. M. Conroy et al., "CLASSY Query-Based Multi-Document Summarization," Proceedings of the Document Understanding Conf. Wksp. 2005 (DUC 2005) at the Human Language Technology Conf./Conf. on Empirical Methods in Natural Language Processing (HLT/EMNLP); T. Baumel et al., "Query-Chain Focused Summarization," ACL (1) 2014: 913-922; and G. Erkan et al., "LexRank: Graph-based Lexical Centrality as Salience in Text Summarization." Journal of Artificial Intelligence Research (JAIR) 22.1 (2004): 457-479, which are incorporated by reference herein.

In step 210, the selected cluster is labeled and the service events database 114 is updated to indicate the label. This step illustratively involves user entry of a label for the selected cluster via the labeling interface 115 of the cluster labeling system 104. Such a user illustratively comprises a subject matter expert (SME) and such an entity can be at least partially automated. The FIG. 2 process can advantageously allow an SME or other user to accurately label clusters of documents with relative ease and speed.

Steps 200 through 210 can be repeated periodically or as needed to process additional documents comprising unstructured text data from the service events database 114.

After labels are assigned to multiple clusters of documents, additional analysis or other processing can be performed, possibly involving the above-noted SME.

The particular processing operations and other system functionality described in conjunction with the flow diagram of FIG. 2 are presented by way of illustrative example only, and should not be construed as limiting the scope of the invention in any way. Alternative embodiments can use other types of processing operations for implementing a cluster labeling system or portions thereof. For example, the ordering of the process steps may be varied in other embodiments, or certain steps may be performed concurrently with one another rather than serially.

It is to be appreciated that cluster labeling functionality such as that described in conjunction with the flow diagram of FIG. 2 can be implemented at least in part in the form of one or more software programs stored in memory and executed by a processor of a processing device such as a computer or a virtual machine. As mentioned previously, a memory or other storage device having such program code embodied therein is an example of what is more generally referred to herein as a "processor-readable storage medium."

As mentioned previously, the configuration of information processing system 100 is exemplary only, and numerous other system configurations can be used in implementing a cluster labeling system as disclosed herein.

FIG. 3 shows another example of an information processing system 300 that implements a cluster labeling system in an illustrative embodiment. The system 300 comprises a data layer portion 302, an application portion 304 and a front end portion 306. The data layer portion 302 comprises data 308 that is processed by an analytics system 310 illustratively implemented as a Greenplum® system. Additional functional elements 312 illustratively include a plurality of elements for implementing respective MADlib, Map-Reduce, pgplsql and GPText functionality. These elements interact with the analytics system 310 with input from the application portion 304.

The application portion 304 comprises a set of Linux-based servers 314 illustratively implemented using virtual machines. These include a Linux-based server 314-1 that performs language processing using Java, Python Natural Language Toolkit (NLTK) and Mallet. The server 314-1 interacts with the analytics system 310 via Java DataBase Connectivity (JDBC) and receives data subsets therefrom as illustrated.

The front end portion 306 comprises a web server 316 also illustratively implemented using one or more virtual machines and includes a user interface 318 providing visualizations of the type described elsewhere herein. The web server 316 communicates with the server 314-1 via Flask and a RESTful API as illustrated, and may additionally or alternatively communicate with one or more other servers 314 of the application portion 304 via additional connections shown by a dashed arrow in the figure.

The various portions of system 300 are adapted in the present embodiment to implement the functionality of the cluster labeling system 104 as previously described. This particular system configuration is only an example, and numerous other arrangements of system components can be used to provide that functionality.

Referring now to FIGS. 4A through 4E, an exemplary user interface display 400 generated by the cluster labeling system 104 is shown. The same user interface display 400 is shown in each of these figures, but features of different portions of the user interface display are highlighted in FIGS. 4B, 4C, 4D and 4E. The user interface display 400 is assumed to be one of a plurality of different user interface displays that are generated by the cluster labeling system 104, possibly in conjunction with an associated analysis and visualization tool.

As illustrated in FIG. 4A, the user interface display 400 includes a control panel 402, a console log 404, a contrastive topic visualization 405, a bigram visualization 406 and a summarization visualization 408.

Figure 4B:
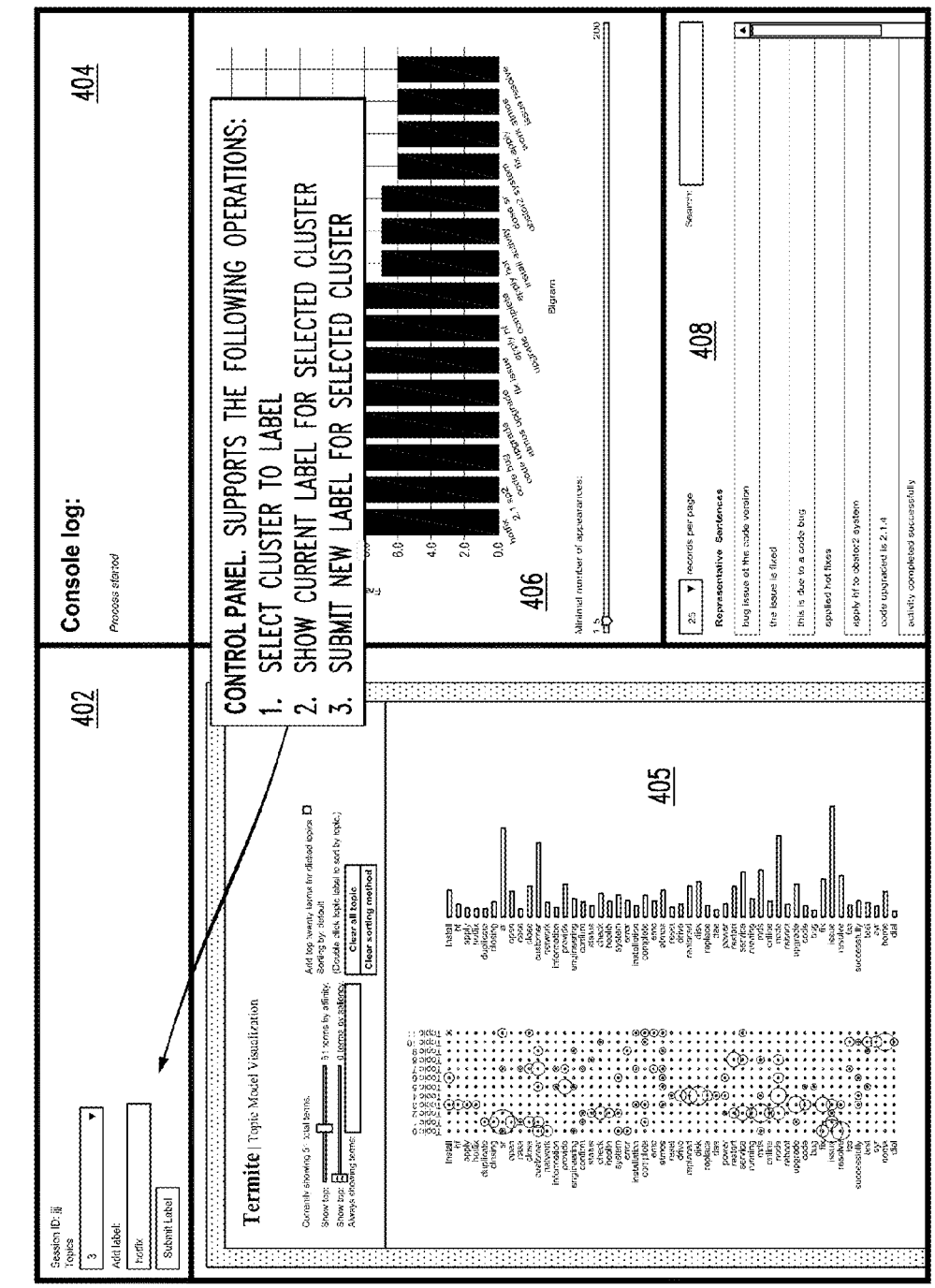

FIG. 4B indicates that the control panel 402 provides user control functionality for operations that illustratively include selecting a cluster to label, showing a current label for a selected cluster, and submitting a new label for a selected cluster. User input provided to the control panel 402 can be at least in part responsive to information presented in the console log 404, which supports interaction between the cluster labeling system 104 and a user.

Figure 4C:
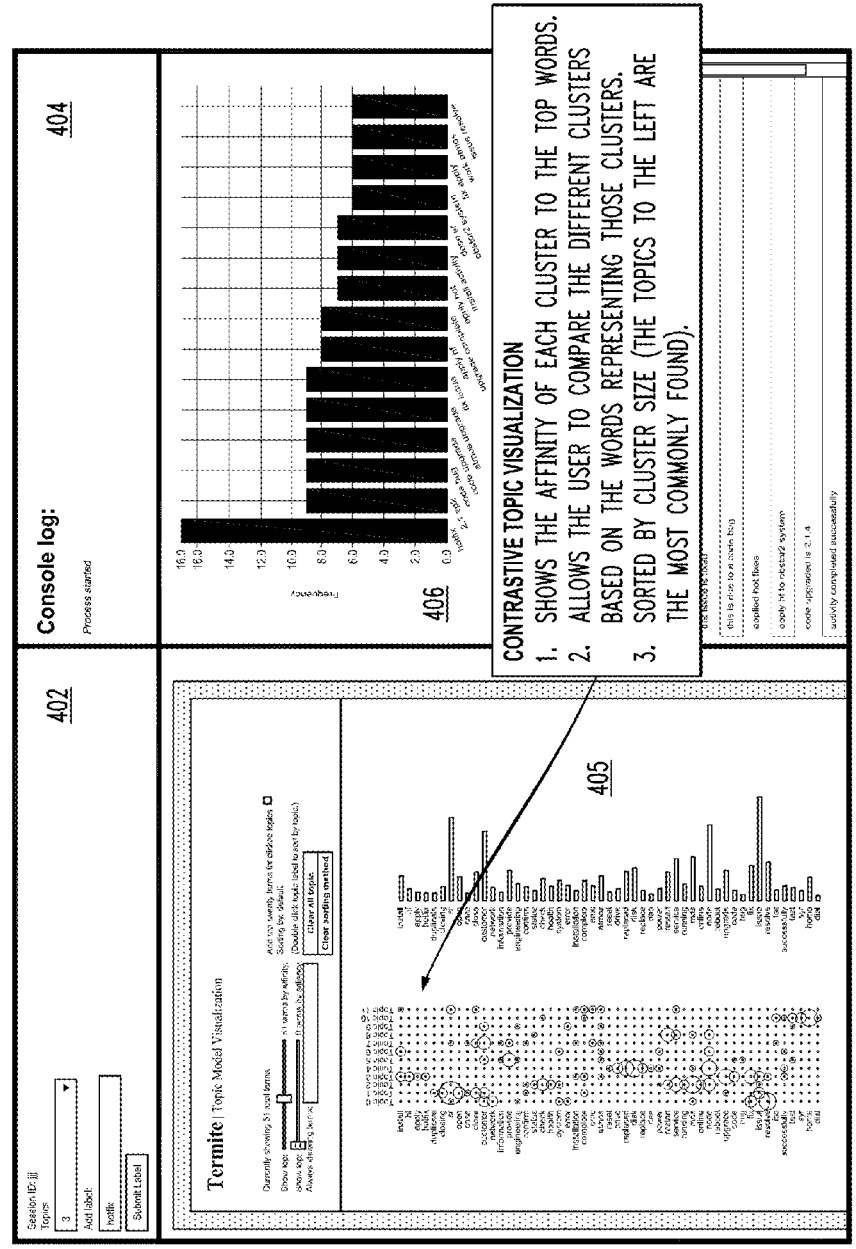

FIG. 4C indicates that the contrastive topic visualization 405 shows the affinity of each of a plurality of clusters to so-called "top words" which in this embodiment comprise a specified number of words which appear with greatest frequency in the corresponding documents. This visualization allows the user to compare the different clusters based on the words representing those clusters. The clusters are sorted by cluster size, with the corresponding topics to the left being those that are most commonly found.

The contrastive topic visualization in this embodiment is generated using an embedded version of the Termite tool described in J. Chuang et al., "Termite: Visualization Techniques for Assessing Textual Topic Models," International Working Conference on Advanced Visual Interfaces (AVI), May 2012, Capri Island, Italy, pp. 74-77, which is incorporated by reference herein. However, other techniques can be used to generate a contrastive topic visualization for multiple topics corresponding to multiple ones of the clusters, including, for example, word clouds, heatmaps, lists, etc.

Figure 4D:
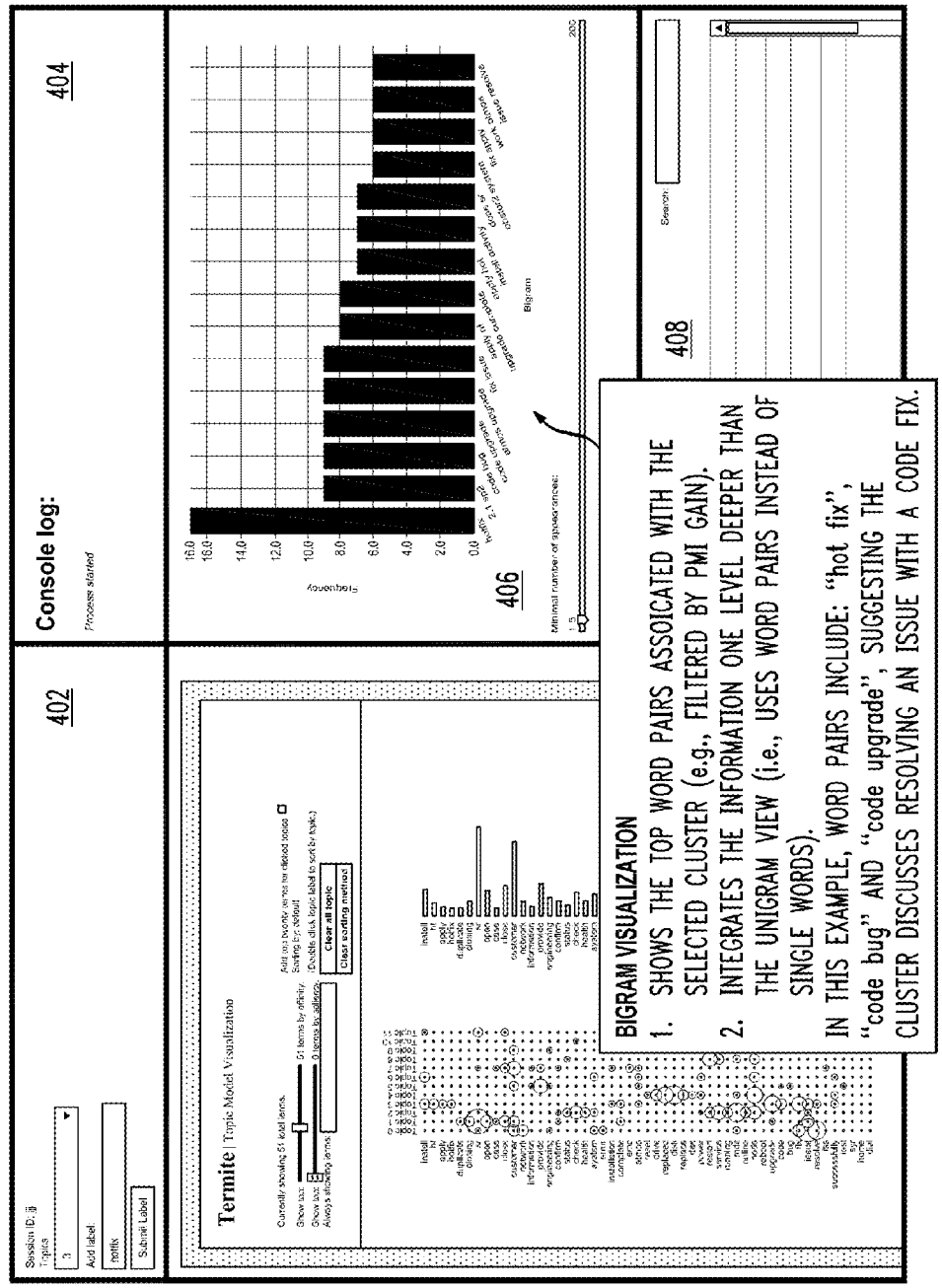

FIG. 4D indicates that the bigram visualization 406 shows the top word pairs associated with a particular selected cluster. This visualization illustratively filters the word pairs by PMI gain. More particularly, the top 15 bigrams are shown, as determined by first ordering the word pairs by PMI gain and then reordering the word pairs by frequency. The bigram visualization 406 integrates the cluster information one level deeper than unigram views such as those provided by the contrastive topic visualization 405, in that it uses word pairs instead of single words. In this example, word pairs include: "hot fix", "code bug" and "code upgrade", suggesting the cluster discusses resolving an issue with a code fix.

In generating the bigram visualization 406, PMI gain values may be determined in accordance with the following equation:

PMI ("word1 word2"=log(count("word1 word2")/(count ("word1")*count("word2")/total_number_of_words))

This exemplary PMI gain computation, which is repeated for each of the candidate word pairs, can be applied after redundancy reduction is performed, possibly using the greedy controlled redundancy sub-corpus construction algorithm described in the above-cited reference R. Cohen et al., "Redundancy in electronic health record corpora: analysis, impact on text mining performance and mitigation strategies," BMC Bioinformatics 2013, 14:10.

Figure 4E:
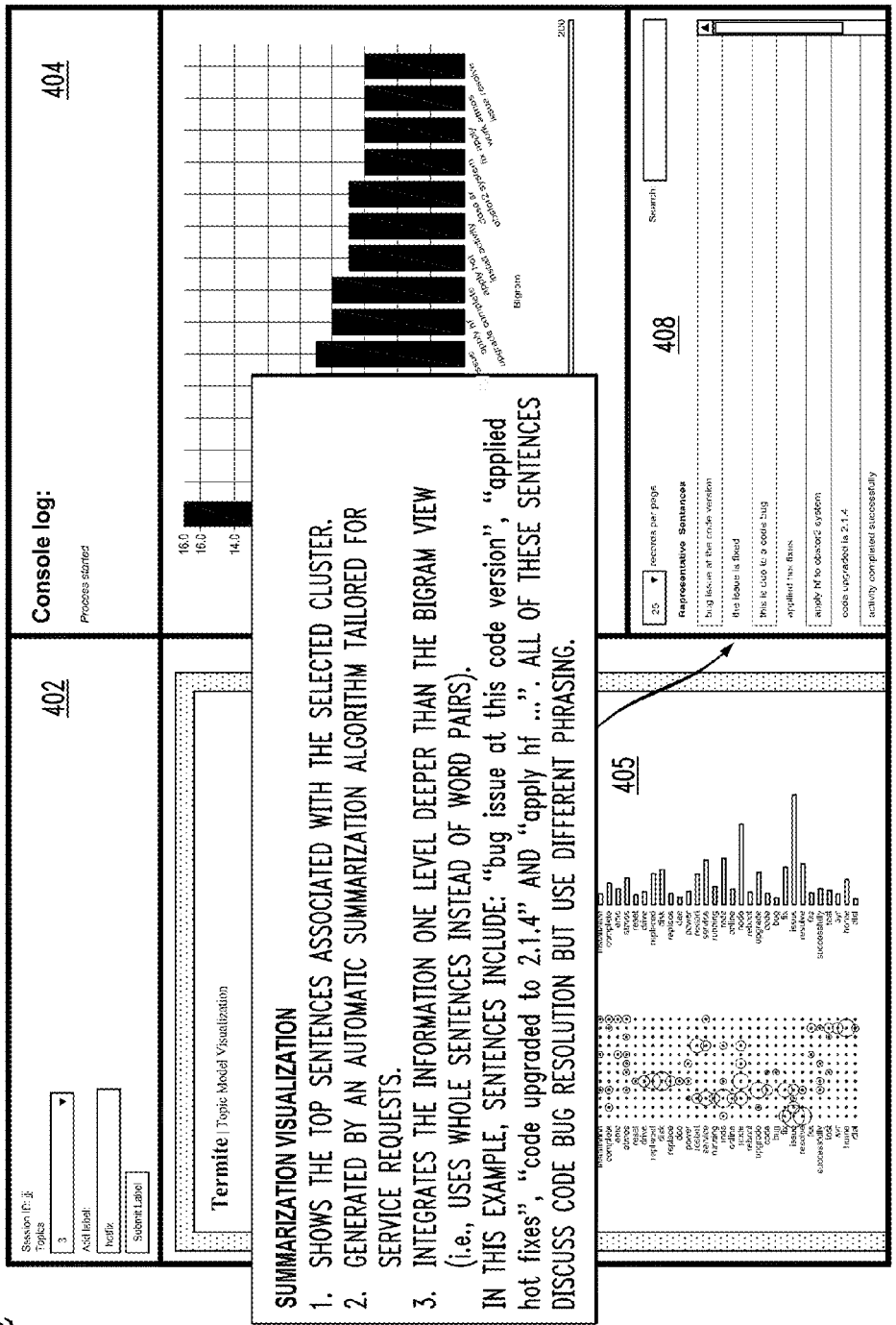

FIG. 4E indicates that the summarization visualization 408 shows the top sentences associated with the particular selected cluster. This visualization is illustratively generated by an automatic summarization algorithm, such as SumBasic, BayesSum or Classy, possibly tailored for processing unstructured text data of service request summaries. The summarization visualization 408 integrates the cluster information one level deeper than the bigram visualization 406, in that it uses whole sentences instead of word pairs. The highest ranking representative sentences are presented as sentence-level summarizations of the corresponding topic. In this example, representative sentences include: "bug issue at this code version", "applied hot fixes", "code upgraded to 2.1.4" and "apply hf . . . ". All of these sentences discuss code bug resolution but use different phrasing.

FIG. 5 shows an additional user interface display 500 generated by the cluster labeling system 104 in an illustrative embodiment. The user interface display 500 includes unigram and aggregate probability visualizations 502-0, 502-1, 502-2 and 502-3 for respective clusters denoted by respective topic identifiers or topic_id values 0, 1, 2 and 3. The clusters are ordered by decreasing aggregate probability. These visualizations show the top words associated with each of multiple clusters, and provides the aggregate probability of the top words appearing in each of the clusters. The aggregate probability for a given one of the clusters provides a measure of "compactness" for that cluster. In this example, words include: "upgrade", "install", "apply", "hotfix", "sp2" and "hf". These words relate to resolution via an upgrade or hot fix.

It should be understood that the particular user interface displays illustrated in FIGS. 4 and 5 are presented by way of example only, and should not be construed as limiting the scope or functionality of the cluster labeling system 104 in any way.

The illustrative embodiments provide a number of significant advantages relative to the conventional arrangements described above. For example, these embodiments provide particularly efficient cluster labeling systems for unstructured text data. User interface displays such as those illustrated in FIG. 4 provide a combination of multiple distinct visualizations that provide an extended view of topic-term relationships so as to considerably facilitate the assignment of labels to clusters.

As indicated previously, the cluster labeling systems in the illustrative embodiments are data driven in that relevant topics are elevated automatically from the actual unstructured text data itself rather than determined by attempting to impose a limited set of predefined themes on the unstructured text data.

The illustrative embodiments therefore advantageously avoid the need for manual screening in which a corpus of unstructured text data is reviewed and sampled by service personnel.

Furthermore, there is no need for manual customization and maintenance of a large set of rules that can be used to determine correspondence with predefined themes of interest. For example, the illustrative embodiments do not require rule updates to accommodate previously unseen terms appearing in unstructured text data.

In addition, cluster labeling systems as disclosed herein can provide significant insights into unstructured text data in a very short period of time. Particular studies can be configured and executed quickly, with large quantities of analysis output being available almost immediately. Also, such studies can be easily reconfigured and repeated as needed using different sets of parameters.

It is to be appreciated that the foregoing advantages are illustrative of advantages provided in certain embodiments, and need not be present in other embodiments.

It was noted above that portions of the information processing system 100 may be implemented using one or more processing platforms. Illustrative embodiments of such platforms will now be described in greater detail. Although described in the context of system 100, these processing platforms may also be used to implement at least portions of other information processing systems in other embodiments of the invention, such as the information processing system 300 of FIG. 3.

Figure 6:
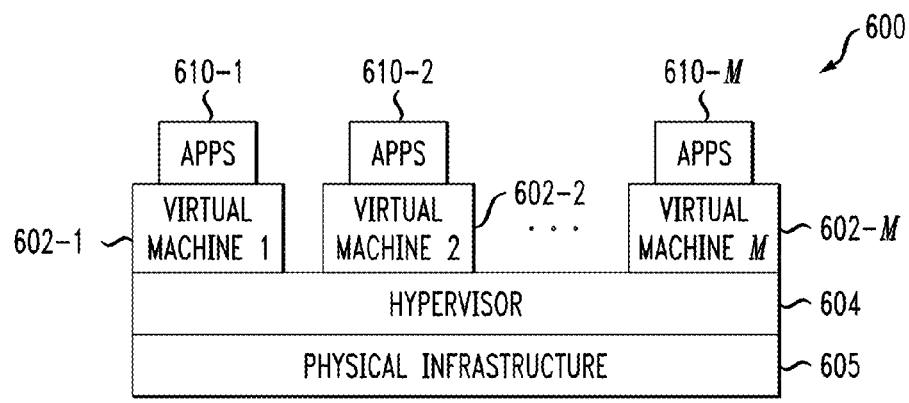
FIGS. 6 and 7 show examples of processing platforms that may be utilized to implement at least a portion of one or more of the information processing systems of FIGS. 1 and 3.
Figure 7:
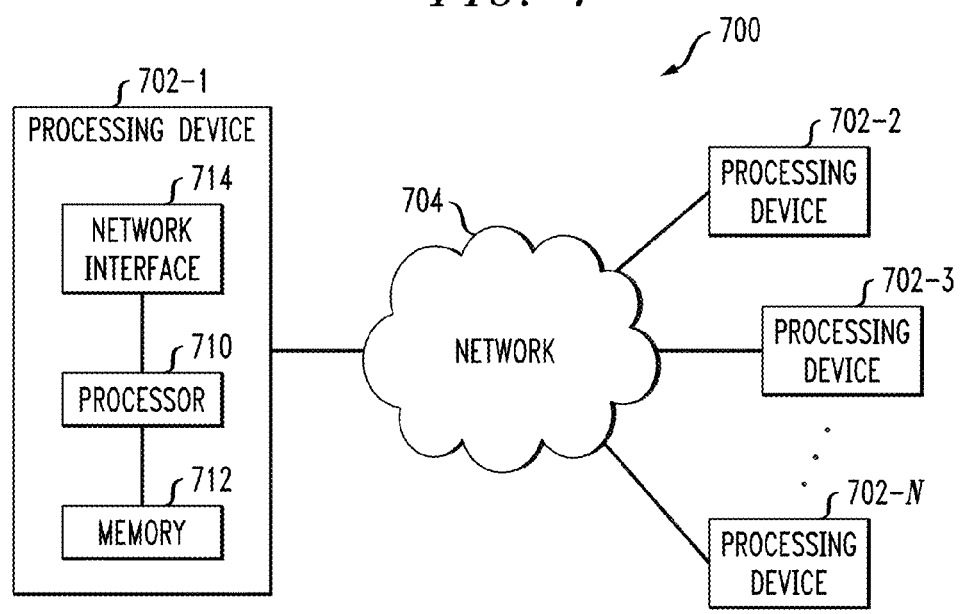

As shown in FIG. 6, portions of the information processing system 100 may comprise cloud infrastructure 600. The cloud infrastructure 600 comprises virtual machines (VMs) 602-1, 602-2, . . . 602-M implemented using a hypervisor 604. The hypervisor 604 runs on physical infrastructure 605. The cloud infrastructure 600 further comprises sets of applications 610-1, 610-2, . . . 610-M running on respective ones of the virtual machines 602-1, 602-2, . . . 602-M under the control of the hypervisor 604.

Although only a single hypervisor 604 is shown in the embodiment of FIG. 6, the system 100 may of course include multiple hypervisors each providing a set of virtual machines using at least one underlying physical machine. For example, different sets of virtual machines provided by respective ones of multiple hypervisors may be utilized in configuring multiple instances of clustering module 110, visualization module 112, labeling interface 115 or other components of the system 100.

An example of a commercially available hypervisor platform that may be used to implement hypervisor 604 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include storage products, such as VNX® and Symmetrix VMAX®, both commercially available from EMC Corporation of Hopkinton, Mass. A variety of other storage products may be utilized to implement at least a portion of the system 100.

One or more of the processing modules or other components of system 100 may therefore each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-N, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an ASIC, an FPGA, or other type of processing circuitry, as well as portions or combinations of such circuitry elements.

The memory 712 may comprise RAM, ROM or other types of memory, in any combination. As mentioned previously, the memory 712 and other memories disclosed herein should be viewed as illustrative examples of what are more generally referred to as "processor-readable storage media" storing executable program code of one or more software programs, and articles of manufacture comprising such processor-readable storage media are considered embodiments of the present invention.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

It should again be emphasized that the above-described embodiments of the invention are presented for purposes of illustration only. Many variations may be made in the particular arrangements shown and described. For example, although described in the context of particular system and device configurations, the techniques are applicable to a wide variety of other types of information processing systems, processing devices, and other components. In addition, the particular modules, processing operations and other exemplary features of the illustrative embodiments may be varied to meet the needs of other implementations. Moreover, it should be understood that the various assumptions made above in describing illustrative embodiments need not apply in other embodiments. Numerous other embodiments within the scope of the appended claims will be readily apparent to those skilled in the art.

What is claimed is:

1. An apparatus comprising:
a processing platform configured to implement a cluster labeling system for documents comprising unstructured text data from a service events database;
the unstructured text data comprising unstructured service request summaries relating to respective service events;
wherein the cluster labeling system comprises:
a clustering module implementing a topic model generator and being configured to assign each of the documents to one or more of a plurality of clusters based at least in part on one or more topics identified from the unstructured text data using at least one topic model provided by the topic model generator;
a visualization module comprising multiple view generators, the multiple view generators being configured to generate respective distinct visualizations of a selected one of the clusters; and
a labeling interface permitting user entry of a label for the selected cluster;
wherein the multiple view generators comprise at least:
a bigram view generator configured to provide a visualization of a plurality of term pairs from the selected cluster; and
a summarization view generator configured to provide a visualization of representative term sequences from the selected cluster;
wherein the cluster labeling system is further configured to update the service events database to indicate a user-entered label for the selected cluster; and
wherein the processing platform comprises one or more processing devices each comprising a processor coupled to a memory.

2. The apparatus of claim 1 wherein the multiple view generators further comprise a unigram and aggregate probability view generator configured to provide a visualization of a plurality of individual terms from the selected cluster with the aggregate probability comprising a combination of individual probabilities that respective ones of the terms appear in the selected cluster.

3. The apparatus of claim 1 wherein the visualization module is further configured to generate a contrastive topic visualization for multiple topics corresponding to multiple ones of the clusters.

4. The apparatus of claim 1 wherein the bigram view generator is further configured to order the term pairs from the selected cluster based at least in part on pointwise mutual information (PMI) gain.

5. The apparatus of claim 4 wherein the bigram view generator is further configured to initially order the term pairs based on PMI gain and then to reorder the ordered term pairs based on frequency of occurrence in the selected cluster.

6. The apparatus of claim 1 wherein the summarization view generator is further configured to identify the representative term sequences from the selected cluster using an automatic summarization algorithm.

7. The apparatus of claim 6 wherein the automatic summarization algorithm comprises at least one of SumBasic, BayesSum and Classy.

8. The apparatus of claim 1 wherein the term pairs comprise respective word pairs, and the term sequences comprise respective sentences each having three or more words.

9. The apparatus of claim 1 wherein the cluster labeling system further comprises a preprocessing module implementing a data indexer and a dictionary generator, the data indexer being configured to process the unstructured text data to construct term indexes for respective ones of the documents, and the dictionary generator being configured to process the term indexes to construct one or more dictionaries for use by the topic model generator in providing said at least one topic model.

10. The apparatus of claim 1 wherein the unstructured service request summaries comprise one or more problem summaries and one or more corresponding solution summaries.

11. The apparatus of claim 1 wherein the topic model generator is configured to implement at least one of latent Dirichlet allocation (LDA), probabilistic latent semantic analysis (pLSA) and canonical-correlation analysis (CCA).

12. The apparatus of claim 1 wherein the cluster labeling system is implemented as part of an analysis and visualization tool for unstructured text data analysis and visualization.

13. An information processing system comprising the apparatus of claim 1.

14. A method comprising:
  obtaining documents comprising unstructured text data from a service events database, the unstructured text data comprising unstructured service request summaries relating to respective service events;
  assigning each of the documents to one or more of a plurality of clusters based at least in part on one or more topics identified from the unstructured text data using at least one topic model;
  generating multiple distinct visualizations of a selected one of the clusters including at least:
    a bigram visualization of a plurality of term pairs from the selected cluster; and
    a summarization visualization of representative term sequences from the selected cluster;
  permitting user entry of a label for the selected cluster via a labeling interface; and
  updating the service events database to indicate a user-entered label for the selected cluster;
  wherein the obtaining, assigning, generating, permitting and updating are performed by a processing platform comprising one or more processing devices.

15. The method of claim 14 wherein generating multiple distinct visualizations further comprises generating a unigram and aggregate probability visualization of a plurality of individual terms from the selected cluster with the aggregate probability comprising a combination of individual probabilities that respective ones of the terms appear in the selected cluster.

16. The method of claim 14 further comprising generating a contrastive topic visualization for multiple topics corresponding to multiple ones of the clusters.

17. The method of claim 14 wherein generating the bigram visualization comprises initially ordering the term pairs based on PMI gain and then reordering the ordered term pairs based on frequency of occurrence in the selected cluster.

18. An article of manufacture comprising a non-transitory processor-readable storage medium having one or more software programs embodied therein, wherein the one or more software programs when executed by at least one processing device of a processing platform cause the processing device:
  to obtain documents comprising unstructured text data from a service events database, the unstructured text data comprising unstructured service request summaries relating to respective service events;
  to assign each of the documents to one or more of a plurality of clusters based at least in part on one or more topics identified from the unstructured text data using at least one topic model; and
  to generate multiple distinct visualizations of a selected one of the clusters including at least:
    a bigram visualization of a plurality of term pairs from the selected cluster; and
    a summarization visualization of representative term sequences from the selected cluster;
  to permit user entry of a label for the selected cluster via a labeling interface; and
  to update the service events database to indicate a user-entered label for the selected cluster.

19. The article of manufacture of claim 18 wherein the unstructured service request summaries comprise one or more problem summaries and one or more corresponding solution summaries.

20. The article of manufacture of claim 18 wherein generating multiple distinct visualizations further comprises generating a unigram and aggregate probability visualization of a plurality of individual terms from the selected cluster with the aggregate probability comprising a combination of individual probabilities that respective ones of the terms appear in the selected cluster.

* * * * *